Dec. 7, 1926.

E. E. WEMP

CLUTCH

Filed April 13, 1925     2 Sheets-Sheet 1

1,609,448

INVENTOR.
Ernest E. Wemp
BY
Stuart C. Barnes
ATTORNEY.

Dec. 7, 1926.

E. E. WEMP

CLUTCH

Filed April 13, 1925    2 Sheets-Sheet 2

1,609,448

INVENTOR.
Ernest E. Wemp
BY Stuart C. Barnes
ATTORNEY.

Patented Dec. 7, 1926.

1,609,448

UNITED STATES PATENT OFFICE.

ERNEST E. WEMP, OF DETROIT, MICHIGAN.

CLUTCH.

Application filed April 13, 1925. Serial No. 22,563.

This invention relates to clutches and power lines, and has for its purpose the interposition of yieldable means in the power line to take the shocks due to sudden changes in the load.

More particularly, the invention is concerned with the interposition of yieldable members in the power line in such a way as to give a limited flexibility angularly, but which does not permit any appreciable flexure longitudinally of the power line. These yieldable members are preferably incorporated in the clutch unit and are interposed between the driven member and the driven shaft, preferably between the hub and the driven disc.

It is not broadly new to interpose flexible discs either in the universal joint or in the clutch. However, these flexible discs are not only yieldable angularly but are more or less yieldable in other directions. Consequently they are not calculated to keep the rotating members in proper position and they often result in the rotating masses being distorted from their designed locations during the rotating movement, resulting in thumping, chattering and wearing of the parts. By my improved design, the parts are held and properly guided so that there can be a yield only angularly of the shaft. This is the only direction in which the yield is functionally desirable, consequently no difficulties are encountered by reason of interposing a non-metallic member in the driving line. This will be more fully explained hereinafter.

Referring to the drawings.

$a$ designates the fly-wheel or driving member to which is removably secured a cover plate $b$ which is another driving member. On this is fulcrumed a plurality of pressure relieving levers $c$, whose inner ends are engaged by the clutch-shifting collar $d$; their outer ends are pivoted to the releasing pins $e$ which engage with the pressure disc $f$, which is another one of the driving members. These elements are all old and are described in some of my prior applications, and are simply parts of a multiple disc clutch, but preferably of a type known as the single-plate clutch. However, I do not desire to be limited to the single-plate type. The driven element is here shown as a single disc $g$, which is preferably a flexible metal disc having the triangular slots $h$ which give the disc the spoked type which is claimed in my Reissue Patent No. 16,014. This, however, simply illustrates a suitable type to be used in connection with my improvement.

Figure 1:
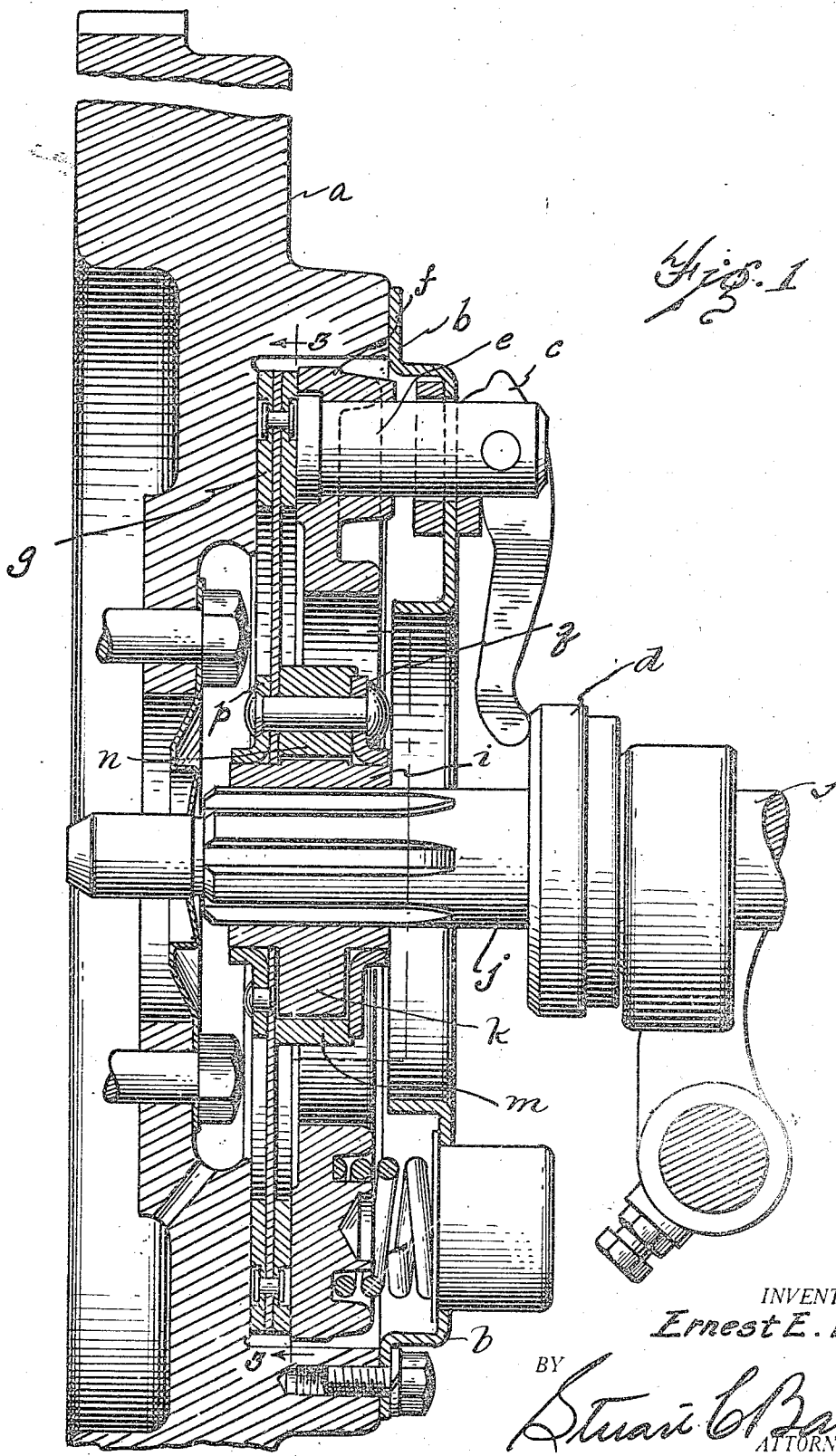
Fig. 1 is a section of the clutch incorporating my improvement.
Figure 2:
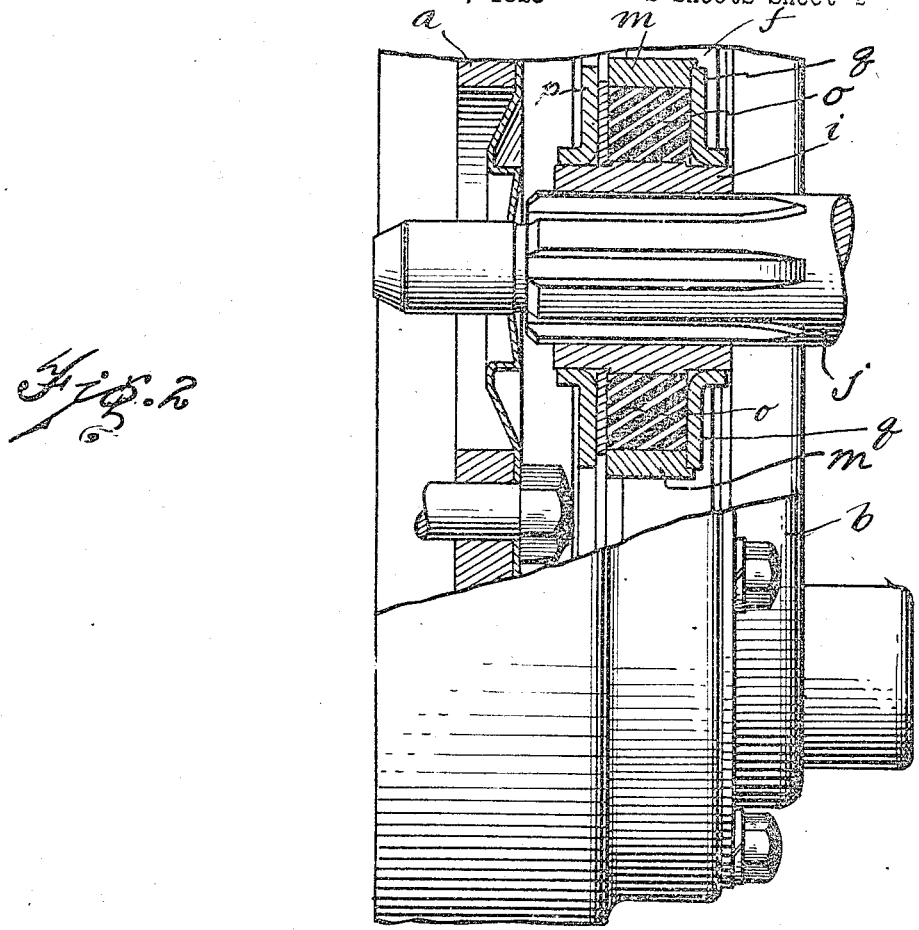
Fig. 2 is a fragmentary view, partly in section, showing the rubber blocks and the associated parts.
Figure 3:
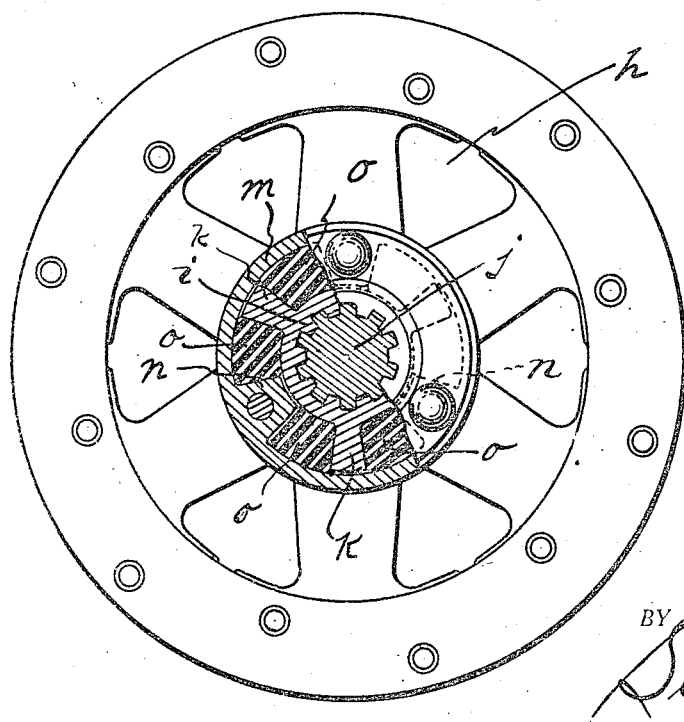
Fig. 3 is an elevation of the driven element partly in section.

The clutch hub $i$ is splined onto the end of the driven shaft $j$ in the type of clutch I have shown. However, it would be permissible to have the hub locked immovably on the end of the shaft, so far as the character of my improvement is concerned. This hub is of special construction, as will appear from Fig. 3, being provided with a plurality of radial ribs $k$. Arranged to encircle this is a ring $m$, preferably a die-casting of aluminum. This ring is provided with a plurality of inwardly extending ribs $n$. Blocks of rubber $o$, either rubber composition material or other yieldable material are interposed preferably in a crowded relation in the spaces between the inwardly projecting ribs and the outwardly projecting ribs $k$. The driven disc is then assembled on the one side of the hub, and the two collars $p$ and $q$ are riveted in place, thereby completing the assembly of the driven element and if the riveting has been tightly done, it will be seen that there can be no yield longitudinally of the driving line, but there is a small permissible yield angularly of the driving line. This is calculated to relieve the rigid condition which obtains in an all-metal driving line, and to interpose such a slight yield as is calculated to take up, in a measure, sudden shocks due to sudden changes of the load.

Preferably all the surfaces which contact and have a slight relative movement where the yield takes place, are carefully machined so that the movements will be guided with precision and there will be no distortion of the rotating elements from their proper location so as to cause any thumping, chattering or wear. I refer more particularly to the machining of the surfaces of the ring, the two collars, and the hub.

What I claim is:

1. In a clutch, a driven member comprising a hub, a driven disc seated concentrically on the hub, said hub provided with ribs, a ring encircling the hub, abutting laterally against said disc and provided with inwardly projecting ribs engaging in the spaces between the aforementioned ribs, and blocks of yieldable non-metallic material crowded between the ribs, and means restraining said parts from yielding laterally of the disk.

2. In a clutch, a driven member comprising a hub, a driven disc seated on said hub, said hub provided with ribs, a ring encircling the hub, abutting laterally against the center portion of the disc and provided with inwardly projecting ribs engaging in the spaces between the aforementioned ribs, blocks of deformable material crowded between the ribs, and means clamping the parts together but permitting yield angularly of the power line but preventing yield longitudinally thereof.

3. In a clutch, a driven member comprising a hub, a driven disc seated on the hub, said hub provided with ribs, a ring encircling the hub abutting laterally against the center portion of the disc and provided with inwardly projecting ribs engaging in the spaces between the aforementioned ribs, blocks of yieldable material crowded between the ribs, and collars clamped together on the outside of the parts to prevent yield longitudinally of the power line but permitting yield angularly thereof, the disc and ring being keyed together.

4. In a clutch, a driven disc and a hub in driving relation with respect to each other, blocks of distortable material supported between said members in pockets so that the same are closely restrained on all sides.

In testimony whereof I have affixed my signature.

ERNEST E. WEMP.